(12) United States Patent
Wassef et al.

(10) Patent No.: US 12,515,682 B2
(45) Date of Patent: Jan. 6, 2026

(54) SMART VEHICLE DISABLE

(71) Applicant: GM GLOBAL TECHNOLOGY OPERATIONS LLC, Detroit, MI (US)

(72) Inventors: Andrew Wassef, Novi, MI (US); Emily Frances Wolfangel, West Bloomfield, MI (US); Ashraf Abualfellat, Grand Blanc, MI (US); Mohammadali Shahriari, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 149 days.

(21) Appl. No.: 18/364,943

(22) Filed: Aug. 3, 2023

(65) Prior Publication Data

US 2025/0042422 A1    Feb. 6, 2025

(51) Int. Cl.
*G07C 5/08*      (2006.01)
*B60W 50/035*    (2012.01)
*B60W 50/14*     (2020.01)

(52) U.S. Cl.
CPC .......... *B60W 50/035* (2013.01); *B60W 50/14* (2013.01); *G07C 5/0808* (2013.01); *G07C 5/0816* (2013.01); *B60W 2520/10* (2013.01)

(58) Field of Classification Search
None
See application file for complete search history.

(56) References Cited

U.S. PATENT DOCUMENTS 9,663,104 B2 * 5/2017 Hauler .................. B60W 30/08
10,054,947 B2 * 8/2018 Mays ........................ B60T 7/18
11,919,526 B1 * 3/2024 Agarwal ............. B60W 50/029

FOREIGN PATENT DOCUMENTS

DE     102017213073 A1 * 1/2019 ............ B60W 50/02

\* cited by examiner

*Primary Examiner* — Abdhesh K Jha
(74) *Attorney, Agent, or Firm* — Ingrassia Fisher & Lorenz, LLP |

(57) ABSTRACT

A vehicle control system includes a sensor for detecting a vehicle performance characteristic, and a processor for determining a severity of a vehicle system fault in response to the vehicle performance characteristic. The processor determines a safe disable location in response to the vehicle system fault. The processor generates a disable delay request indicative of the safe disable location and the vehicle performance characteristic. A vehicle controller controls a vehicle to proceed to the safe disable location in response to the disable delay request.

20 Claims, 4 Drawing Sheets

SMART VEHICLE DISABLE

The present disclosure generally relates to disabling vehicle systems in response to fault detection to protect vehicle hardware, and more particularly relates to a method and apparatus for receiving a vehicle system fault notification, determining a severity of the vehicle system fault, determining a location of the vehicle, and facilitating additional vehicle function to allow relocation of the vehicle to a preferred stopping area.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various automated driver-assistance systems, such as cruise control, adaptive cruise control, and parking assistance systems correspond to lower automation levels, while true "driverless" vehicles correspond to higher automation levels. These driver assistance systems are dependent on various sensors and communications systems for determining a location of the vehicle within a roadway and for detecting proximate vehicles and other obstacles.

While the need to protect vehicle operation during damaging or destructive operating conditions is clear, it is desirable that any vehicle protect algorithms be activated in a safe location. It is desirable to overcome the aforementioned problems in order to provide systems and methods for vehicle system disable for vehicle propulsion and driver assistance systems. Furthermore, other desirable features and characteristics of the present invention will become apparent from the subsequent detailed description and the appended claims, taken in conjunction with the accompanying drawings and the foregoing technical field and background.

SUMMARY

Disclosed herein are vehicle control methods and systems and related electrical systems for provisioning motor systems, methods for making and methods for operating such systems, and motor vehicles and other equipment such as aircraft, ships, wind turbines and other electric vehicles equipped with onboard propulsion systems. By way of example, and not limitation, there are presented various embodiments of systems for the mitigation of vehicle hardware damage while allowing a vehicle to continue operation until located at a preferred stopping location.

In accordance with an aspect of the present disclosure, a vehicle disablement system for a host vehicle including a sensor for detecting or predicting a characteristic of a vehicle system fault, a processor for determining a severity of the vehicle system fault in response to the characteristic, for determining a safe disable location in response to the severity of the vehicle system fault and a current location and state of the host vehicle, generating a vehicle control data in response to the safe disable location, and a vehicle controller for controlling a vehicle in response to the vehicle control data.

In accordance with an aspect of the present disclosure, the processor is further operative to determine a duration of a navigational time between the current location and the safe disable location and is operative to determine a maximum disable delay in response to the severity of the vehicle system fault. The vehicle control data is generated in response to the maximum disable delay being greater than the navigational time.

In accordance with an aspect of the present disclosure, the characteristic of the vehicle system fault is indicative of a lateral control degradation and the processor is further operative to estimate a host vehicle lane location in response to the lateral control degradation.

In accordance with an aspect of the present disclosure, the characteristic of the vehicle system fault is indicative of a longitudinal control degradation and the processor is further operative to estimate a vehicle speed in response to the longitudinal control degradation.

In accordance with an aspect of the present disclosure, the vehicle control data includes a motion path between the current location and the safe disable location.

In accordance with an aspect of the present disclosure, the processor is further operative to generate a user alert indicative of the safe disable location for presentation at a user interface.

In accordance with an aspect of the present disclosure, the processor is configured to disable a vehicle system in response to the severity of the vehicle system fault exceeding a threshold severity.

In accordance with an aspect of the present disclosure, the processor is configured to disable a vehicle system in response to a determination of the host vehicle arriving at the safe disable location.

In accordance with an aspect of the present disclosure, the processor is configured to delay a disabling of a vehicle system in response to the severity of the vehicle system fault and the current location not being the safe disable location.

In accordance with an aspect of the present disclosure, a method of disabling a vehicle system includes detecting a characteristic of a vehicle system fault, determining a severity of the vehicle system fault in response to the characteristic, determining a safe disable location in response to the severity of the vehicle system fault and a current location of a host vehicle, generating a vehicle control data in response to the safe disable location, and controlling a vehicle in response to the vehicle control data to the safe disable location.

In accordance with an aspect of the present disclosure, the characteristic of the vehicle system fault is indicative of at least one of a lateral control degradation and a longitudinal control degradation.

In accordance with an aspect of the present disclosure, the safe disable location is further determined in response to a situational data and map data received from an ADAS algorithm.

In accordance with an aspect of the present disclosure, a disable delay duration is determined in response to the safe disable location and the vehicle control data is generated in response to the disable delay duration.

In accordance with an aspect of the present disclosure, a disable delay duration is determined in response to the severity of the vehicle system fault and the safe disable location.

In accordance with an aspect of the present disclosure, a user alert is generated in response to the severity of the vehicle system fault exceeding a threshold severity.

In accordance with an aspect of the present disclosure, a delay of a disablement event is requested in response to the characteristic and the severity of the vehicle system fault.

In accordance with an aspect of the present disclosure, a disable delay duration is determined in response to the severity of the vehicle system fault and the safe disable location and the disable delay duration is displayed to a vehicle operator.

In accordance with an aspect of the present disclosure, a vehicle system is disabled in response to the severity of the vehicle system fault exceeding a threshold severity.

In accordance with an aspect of the present disclosure, a vehicle control system includes a sensor for detecting a vehicle performance characteristic, and a processor for determining a severity of a vehicle system fault in response to the vehicle performance characteristic A safe disable location is determined in response to the vehicle system fault. A disable delay request indicative of the safe disable location and the vehicle performance characteristic is generated. A vehicle controller is included for controlling a vehicle to the safe disable location in response to the disable delay request.

In accordance with an aspect of the present disclosure, the vehicle controller is further operative to determine a disable delay duration in response to a current location and the safe disable location. The vehicle is controlled to the safe disable location in response to the disable delay duration being less than a threshold duration corresponding to the severity of the vehicle system fault.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
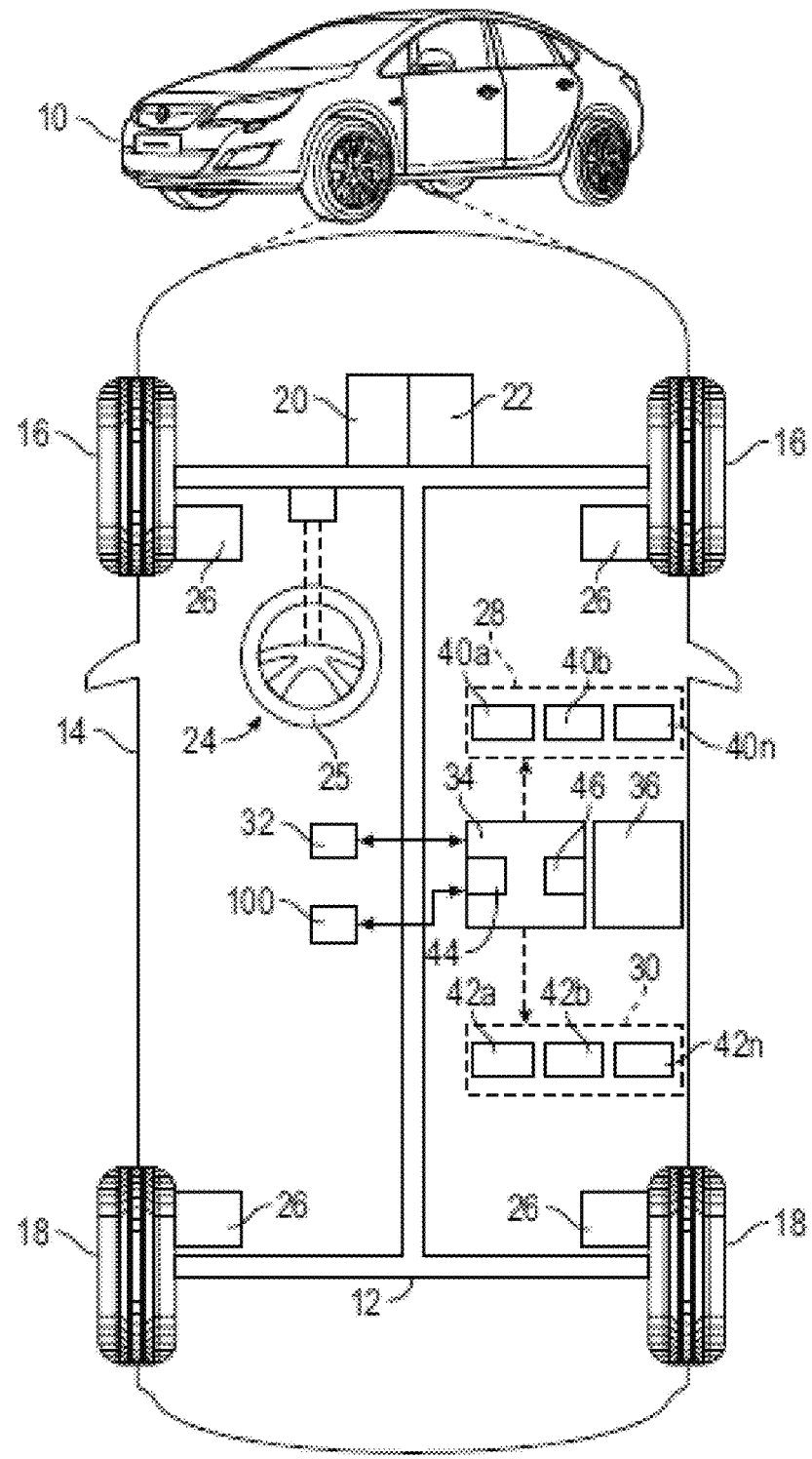
FIG. 1 shows a control system associated with a vehicle in accordance with various embodiments.

With reference to FIG. 1, a control system 100 is associated with a vehicle 10 (also referred to herein as a "host vehicle") in accordance with various embodiments. In general, the control system (or simply "system") 100 provides for control of various actions of the vehicle 10 (e.g., torque control) established by Reinforcement Learning (RL) which is or can be stored in a DNN type model that controls operation in response to data from vehicle inputs, for example, as described in greater detail further below in connection with FIGS. 2-4.

In various exemplary embodiments, system 100 provides a process using an algorithm that controls torque and speed in a host vehicle's 10 embedded controller software of the system 100 allowing DNNs to be used for an ACC behavior prediction model. The system 100 enables learning of driver's preference for following distance for different vehicles such a target vehicle and to classify driver's preference based on driving scenarios; e.g., traffic signs, stop and go traffic, city driving, etc. The system 100 uses a Q-matrix to build a knowledge base for target vehicles following a performance preference by utilizing online and historical driver and environmental information.

As depicted in FIG. 1, vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, vehicle 10 is autonomous or semi-autonomous, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally includes a propulsion system 20, a transmission system 22, a steering system 24, a brake system 26, a canister purge system 31, one or more user input devices 27, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmissions.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences the position of the vehicle wheels 16 and/or 18. While depicted as including a steering wheel for illustrative purposes, in some embodiments contemplated within the scope of the present disclosure, the steering system 24 may not include a steering wheel.

The controller 34 includes at least one processor 44 (and neural network 33) and a computer-readable storage device or media 46. As noted above, in various embodiments, the controller 34 (e.g., the processor 44 thereof) provides data pertaining to a projected future path of the vehicle 10, including projected future steering instructions, to the steering control system 84 in advance, for use in controlling steering for a limited period of time in the event that communications with the steering control system 84 become unavailable. Also, in various embodiments, the controller 34 provides communications to the steering control system 84 via the communication system 36 described further below, for example, via a communication bus and/or transmitter (not depicted in FIG. 1).

In various embodiments, controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store multiple neural networks, along with various operating variables, while the processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As depicted in FIG. 1, the vehicle 10 generally includes, in addition to the above-referenced steering system 24 and controller 34, a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, the vehicle 10 is an autonomous vehicle, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

The controller 34 includes a vehicle controller that operates based on the neural networks 33 model's output. In an exemplary embodiment, a feed-forward operation can be applied for an adjustment factor that is the continuous output of the neural network 33 models to generate a control action for the desired torque or other like action (in case of a continuous neural network 33 models, for example, the continuous APC/SPARK prediction values are outputs).

In various embodiments, one or more user input devices 27 receive inputs from one or more passengers (and driver 11) of the vehicle 10. In various embodiments, the inputs include a desired destination of travel for the vehicle 10. In certain embodiments, one or more input devices 27 include an interactive touch-screen in the vehicle 10. In certain embodiments, one or more input devices 27 include a speaker for receiving audio information from the passengers. In certain other embodiments, one or more input devices 27 may include one or more other types of devices and/or maybe coupled to a user device (e.g., smartphone and/or other electronic devices) of the passengers.

The sensor system 28 includes one or more sensors 40a-40n that sense observable conditions of the exterior environment and/or the interior environment of the vehicle 10. The sensors 40a-40n include but are not limited to, radars, lidars, global positioning systems, optical cameras, thermal cameras, ultrasonic sensors, inertial measurement units, and/or other sensors.

The actuator system 30 includes one or more actuators 42a-42n that control one or more vehicle features such as, but not limited to, canister purge system 31, the intake system 38, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

Figure 2:
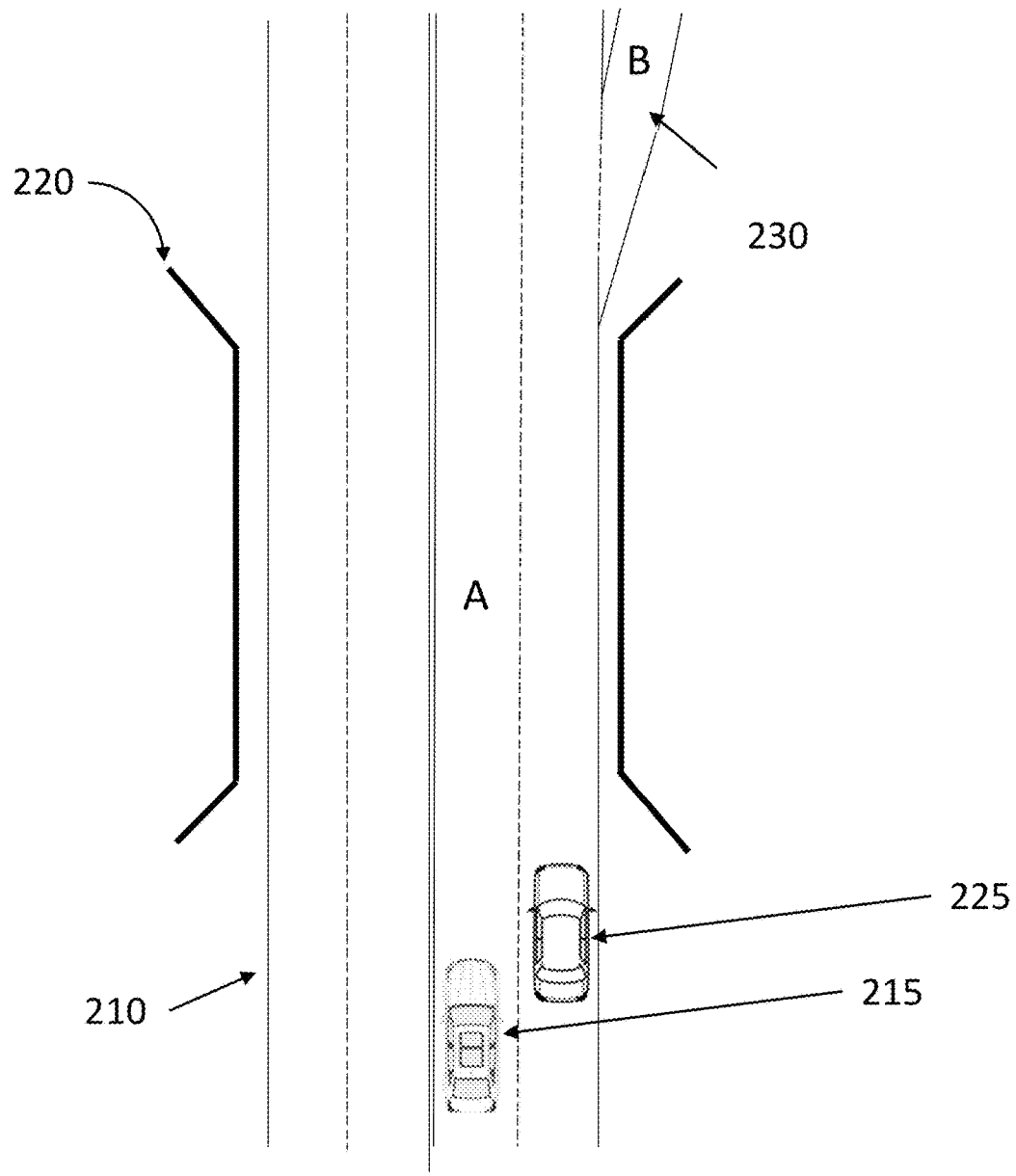
FIG. 2 shows an exemplary environment for use of a smart vehicle disable system in accordance with various embodiments.

The data storage device 32 stores data for use in automatically controlling the vehicle 10, including the storing of data of a DNN that is established by the RL, used to predict a driver behavior for the vehicle control. In various embodiments, the data storage device 32 stores a machine learning model of a DNN and other data models established by the RL. The model established by the RL can take place for a DNN behavior prediction model or RL established model (See. FIG. 2, DNN prediction model or RL prediction model). In an exemplary embodiment, no separate training is required for the DNN rather, the DNN behavior prediction model (i.e., DNN prediction model) is implemented with a set of learned functions. In various embodiments, the neural network (i.e., DNN behavior prediction model) may be established by RL or trained by a supervised learning methodology by a remote system and communicated or provisioned in vehicle 10 (wirelessly and/or in a wired manner) and stored in the data storage device 32. The DNN behavior prediction model can also be trained via supervised or unsupervised learning based on input vehicle data of a host vehicle operations and/or sensed data about a host vehicles operating environment.

The data storage device 32 is not limited to control data, as other data may also be stored in the data storage device 32. For example, route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of controller 34, separate from controller 34, or part of controller 34 and part of a separate system.

Controller 34 implements the logic model established by RL or for the DNN based on the DNN behavior model that has been trained with a set of values, includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In various embodiments, the communication system 36 is used for communications between the controller 34, including data pertaining to a projected future path of the vehicle 10, including projected future steering instructions. Also, in various embodiments, the communication system 36 may facilitate communications between the steering control system 84 and/or more other systems and/or devices.

In certain embodiments, the communication system 36 is further configured for communication between the sensor system 28, the input device 27, the actuator system 30, one or more controllers (e.g., the controller 34), and/or more other systems and/or devices. For example, the communication system 36 may include any combination of a controller area network (CAN) bus and/or direct wiring between the sensor system 28, the actuator system 30, one or more controllers 34, and/or one or more other systems and/or devices. In various embodiments, the communication system 36 may include one or more transceivers for communicating with one or more devices and/or systems of the vehicle 10, devices of the passengers (e.g., the user device 54 of FIG. 2), and/or one or more sources of remote information (e.g., GPS data, traffic information, weather information, and so on).

Turning now to FIG. 2, an exemplary environment 200 for use of a smart vehicle disable system in accordance with various embodiments is shown. The exemplary environment 200 can include a host vehicle 215, a proximate vehicle 225, a roadway 210, a bridge 220, and an exit ramp 230.

As electronic control systems and vehicle sensors have become more ubiquitous in automobiles, vehicle control systems have been able to detect and diagnose problems with various vehicle systems. These vehicle control systems are able to disable malfunctioning vehicle systems before permanent damage to the vehicle system is sustained, such as disabling an engine when an engine temperature exceeds a threshold value for a predetermined length of time, or disabling an automated driver assist system when a critical sensor has failed.

With the advent of more advanced driving systems, vehicle control systems are increasingly capable of establishing vehicle situational awareness such as determining a current vehicle location, the presence of other proximate vehicles and objects, weather and traffic conditions and the like. The currently proposed system is configured to integrate vehicle disablement or degradation systems with the more advanced situational awareness to avoid vehicle disablement or degradation of vehicle operation in undesirable locations or situations. For example, if the driver is on an expressway, a smart vehicle disable system can warn a driver to control the vehicle to a safe location, such as a shoulder of the roadway, can provide a countdown timer until a vehicle is disabled, or even control a vehicle to a safe location before the vehicle is disabled. The smart vehicle disable system leverages existing and developing vehicle sensor systems with existing vehicle control systems to ensure safe operation during vehicle disablement.

The smart vehicle disable system can be configured for coordinating the control for a fail-safe mode by an explicit handshake between advanced driver assistance systems (ADAS) and propulsion and chassis control to enable placing a vehicle in a safe environment before disabling vehicle propulsion or putting the vehicle in a contingent state through systematic coordination and novel ADAS controls adaptation. In some exemplary embodiments, the smart vehicle disable system can redirect and/or restrict vehicle motion to a safe location via autonomous vehicle control when a vehicle system failure is pending which may limit vehicle motion. The smart vehicle disable system within the host vehicle 215 can receive data from the vehicle disablement system indicative of a vehicle condition and an upcoming disable event. The smart vehicle disable system may then receive situational data from the ADAS system, such as locations of proximate vehicles 225, geographic location data, map data or the like. The smart vehicle disable system may determine a predicted disable location A in response to the upcoming disable event and the situational data. If the disable location A is determined to be a high risk area, such as in a left vehicle lane on a bridge 220, the smart vehicle disable system may determine a safe disable location B in response to a nature of the disable event, and the situational data. For example, if the vehicle condition is an engine overheating event, the smart vehicle disable system may determine the safe disable location B and transmit this location to an ADAS vehicle controller and a disable override command to the vehicle disablement system. The ADAS vehicle controller may then control the vehicle to the safe disable location B. In response to the disable override command, the vehicle disablement system can extend the time to the vehicle disable event, can degrade the vehicle performance, such as reducing a number of active engine pistons or modulation and/or reduction of a peak magnitude of a vehicle propulsion current, in order to minimize possible vehicle system damage until the safe disable location B is reached.

In an exemplary embodiment wherein the vehicle disablement system is indicative of an ADAS required sensor fault, such as a lidar or the like, the smart vehicle disable may control a vehicle control system to use data from other sensors, such as GPS, cameras, infrared sensors, V2V communications system or the like to control the host vehicle 215 to the safe disable location B. In some circumstances, controlling vehicle navigation with a subset of operational sensors may not result in the same control accuracy as navigating with a complete set of operational sensors. To alert the driver to any degradation of an ADAS vehicle controller, the smart vehicle disable system can notify a driver of the upcoming disable event and provide an ADAS control override control such that the driver can immediately disable the vehicle during the smart vehicle disable operation. Thus, if the host vehicle might contact a proximate object and/or proximate vehicle B while navigating to the safe disable location B, the driver can disable the vehicle before the contact event. Alternatively, the ADAS controller can hand control of the vehicle back to the driver under some circumstances when safe control of the host vehicle 215 cannot be performed.

Figure 3:
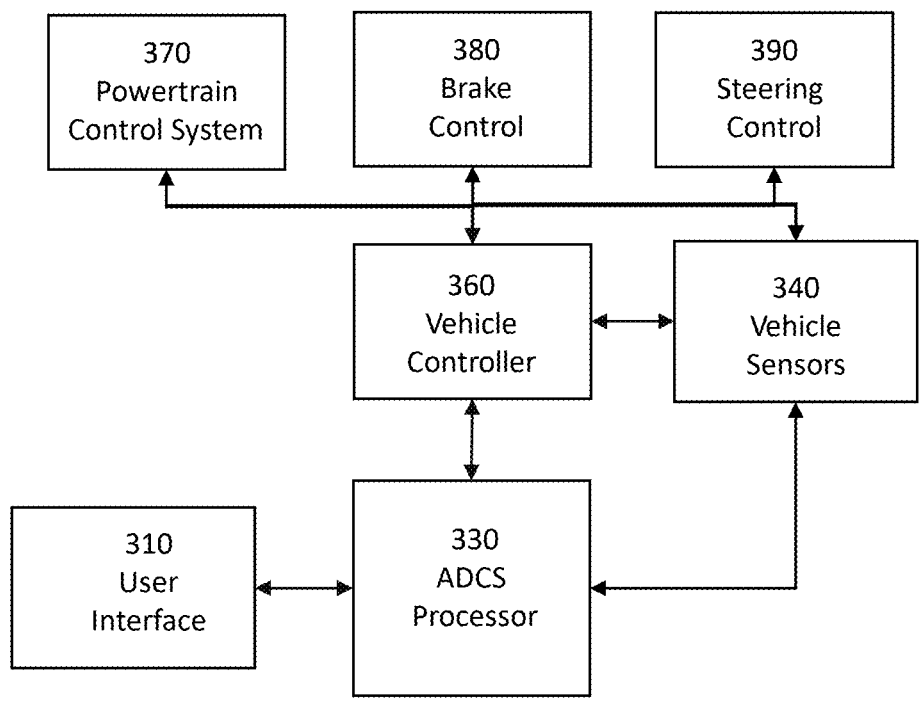
FIG. 3 shows an exemplary configuration of a system for smart vehicle disablement in accordance with various embodiments.

Turning now to FIG. 3, an exemplary system 300 for use of a smart vehicle disable system in accordance with various embodiments is shown. The exemplary system 300 can include a user interface 310, an automated driving control system (ADCS) processor 330, a vehicle controller 360, a powertrain control system 370, a brake controller 380 and a steering controller 390. Although the vehicle controller 360 and the ADCS processor 330 are described as discrete units in the following exemplary embodiments, any of the components or functions may be combined into any combination including a single vehicle control processor operative to perform vehicle control algorithms, ADCS algorithms, ADAS algorithms, vehicle disablement algorithms and smart vehicle disable algorithms.

The user interface 310 can include a user input and/or user communications device for communicating information to a driver or autonomous vehicle user. The communications device can include a display, such as a center stack infotainment display, a warning light, an audible notification or alarm, a haptic feedback, or the like. The vehicle controller 360 and ADCS processor 330 can receive user input from the user interface 310, such as smart vehicle disable confirmations or preferences, and can display warnings, operational instructions, or navigational instructions to a user. For example, the ADCS processor 330 can provide a prompt to a user to request a user confirmation of a desire to delay a vehicle system shutdown to navigate to a safer disable location. In some instances, the user may desire to immediately shut down the vehicle rather than continue operation to a safe disable location and risk additional vehicle system damage.

In some exemplary embodiments, the vehicle controller 360 can be configured to receive sensor data from vehicle sensors, such as inertial measurement units (IMU) wheel speed sensors, engine temperature sensors and the like, as well as control data such as steering wheel position, throttle position, brake position and the like. In vehicles equipped with ADAS, the vehicle controller 360 may further receive control signals from the ADAS controller indicative of a desired vehicle speed, steering direction, brake application, etc. The vehicle controller 360 is configured to generate control signals to couple to the powertrain control system 370, brake controller 380 and steering controller 390 to control the vehicle movement.

The vehicle controller 360 can be configured to monitor vehicle data via the vehicle controller area network (CAN) bus, and/or ADAS algorithm. In response to vehicle data that is outside of normal operational ranges, such as engine temperature, sensor failure, or the like, the vehicle controller 360 can disable a vehicle function, such as propulsion or an ADAS algorithm, or can shut down the vehicle operations completely. The vehicle controller 360 can couple this disable control signal indicative of the shutdown command to the appropriate control systems (ADCS, Propulsion, Braking and Steering).

The ADCS processor 330 can be configured to receive the disable control signal, determine a system to be disabled and a severity of the system failure in response to the disable control signal. The ADCS processor 330 can then determine if the failure mode can be delayed. The delay determination can be made in response to the system to be disabled and the severity of the system failure. In addition, situational data, such as traffic density, location of proximate vehicles and other obstacles and/or road type being travelled can be used to determine if a delay is feasible. In response to a feasible system delay, the ADCS processor 330 can next determine a safe disable location in response to situational data from an ADAS controller and data from other vehicle sensors. If the save disable location can be navigated to considering the system failure, severity of the system failure and duration of a possible disable system delay, the ADCS processor 330 can then request a delay a disable system delay and transmit the safe disable location, navigational data and/or vehicle control data to the vehicle controller 360 to control the vehicle towards the safe disable location. In addition, the ADCS processor 330 can transmit control data to the vehicle controller 360 to restrict or limit the use of some vehicles systems, such as inhibiting vehicle acceleration, inhibiting transmission shifting and/or slow down and other remedial actions to prevent further damage to vehicle systems. Once the vehicle has reached the safe disable location or when disablement delay is no longer possible, the ADCS processor 330 can transmit a total disable of the vehicle system or feature to the vehicle controller 360.

Figure 4:
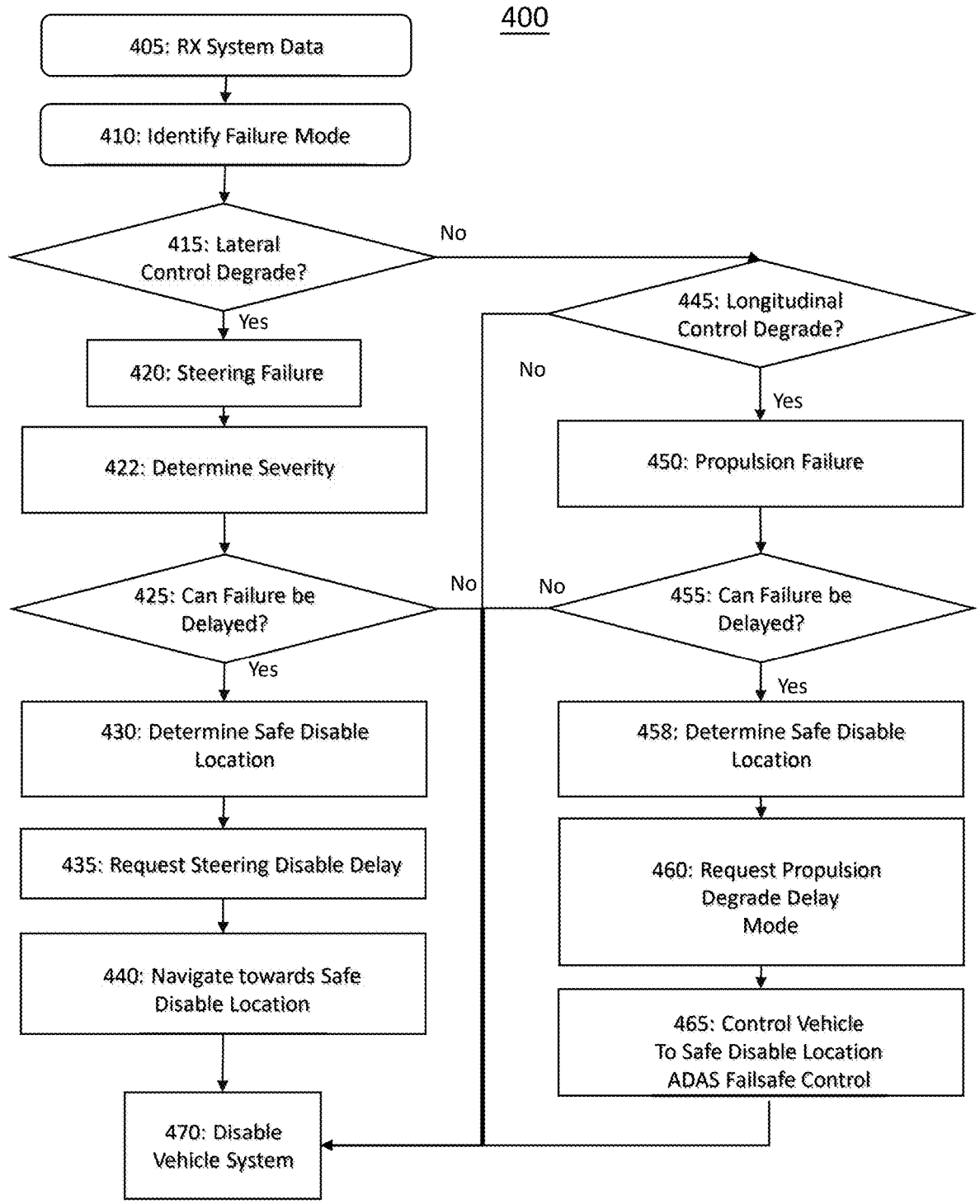
FIG. 4 shows a flowchart illustrative of an exemplary method for enablement of a system for smart vehicle disablement in accordance with various embodiments.

Turning now to FIG. 4, a method 400 for operating a smart vehicle disable system in accordance with various embodiments is shown. The exemplary method 400 is first operative to receive a system data from one or more vehicle data sources, such as vehicle sensors, vehicle control systems, and/or external vehicle data sources, such as V2V, V2I, and vehicle to everything (V2X). The method 400 can next be configured to identify 410 a failure mode of the vehicle in response to the received vehicle data.

The method 400 next determines if 415 the failure mode is a lateral control degradation. Vehicle lateral control degradation is a condition in which the vehicle's ability to stay in its lane is impaired. This can result due to a number of factors, including faulty sensors, damaged tires, and/or poor road conditions. The sensors that are used to measure the vehicle's lateral position and orientation can become faulty, leading to inaccurate readings. This can make it difficult for the lateral control system to keep the vehicle in its lane. Damaged tires can cause the vehicle to wander or drift and driving on rough or slippery roads can also make it difficult for the lateral control system to keep the vehicle in its lane.

In the instance of vehicle lateral control degradation, the method 400 next determines 420 if an electronic power steering (EPS) failure has occurred. EPS uses an electric motor to help turn the steering rack in a car. The EPS system has sensors that determine how much force is being used to turn the wheel. EPS can improve handling and steering feel and can improve vehicle safety by adapting the steering torque to the vehicle speed. EPS can fail due to issues with the mounted electric motor, such as excessive heat, or infiltration of the system by water, dirt, or other contaminants.

In response to a determination of an EPS failure, the method 400 next determines a severity 422 of the EPS failure. The method 400 then determines if 425 the failure mode of the vehicle can be delayed in response to the severity of the EPS failure. If the failure mode cannot be delayed, the method 400 next disables 470 the vehicle system.

If the failure mode can be delayed, the method 400 next determines a safe disable location in response to sensor and map data from an ADAS controller or the like. In response to determination of the safe disable location, the method 400 next requests 435 a delay to the vehicle disablement. The duration of the delay can be dependent on the distance to the safe disable location, the severity of the EPS failure, density of proximate vehicles, availability of alternative safe disable locations and the like.

After receiving a confirmation of the request the delay of the vehicle disablement from a vehicle disable system, the vehicle can be controlled towards the safe disable location. This control may be performed by an automated driver system, a driver assist system and/or in response to instructions and/or warnings provided to a driver. The communication can be further augmented by a display of a time remaining in the requested delay. For example, a display on a center stack infotainment system can display an indication of the time remaining until the delayed vehicle disable event. After the vehicle reaches the safe disable location, the method 400 can disable 470 the vehicle system.

In some exemplary embodiments, the method 400 may engage alternate control algorithms in light of the system failure. For example, in the case of a failure of lateral controls resulting from uncertainty in actuator and sensor measurement such that the ADAS system cannot guarantee lane centering, the method 400 may find an acceptable safe bound for error and ensure that the vehicle stays within the bounded error. The vehicle can be controlled to stay within the bounded error using data from other vehicle sensors, such as cameras and/or GPS location data or the like.

If the lateral control is not degraded, the method 400 can next determine 445 whether the longitudinal control has been degraded. Vehicle longitudinal control degradation is a condition in which the vehicle's ability to maintain a desired speed or distance from the vehicle in front of it is impaired. This can be caused by a number of factors, including defective sensors, damaged actuators, and/or software malfunctions. Sensors used to measure the vehicle's speed, distance to the vehicle in front, and other factors can become faulty over time. This can lead to inaccurate readings, which can cause impair the longitudinal control system. Actuators used to control the vehicle's throttle, brakes, and other systems can also become damaged over time. This can lead to the vehicle having an impaired response to the longitudinal control system's commands, which can cause degradation. In addition, software that is used to control the longitudinal control system can also be affected, leading to the system to operate in an impaired state or with reduced responsiveness.

In response to a determination of a longitudinal control degradation 445, the method 400 next determines if 450 a propulsion system failure has occurred. If a propulsion system failure has occurred, the method 400 next determines if 455 the failure mode can be delayed. If the failure mode cannot be delayed, the method 400 then disables 470 the vehicle system.

If the determined failure mode in response to the propulsion failure can be delayed, the method 400 next determines 458 a safe disable location and requests 460 a propulsion mode degradation delay to the ECM in response to the safe disable location. The method 400 next controls the vehicle to the safe disable location using an ADAS failure mode control or can request a driver control the vehicle to the safe disable location. The driver may be further requested to reduce a vehicle speed when navigating the to the safe disable location.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle disablement system for a host vehicle comprising:
    a sensor for detecting a lateral control degradation;
    a processor configured to:
    determine a severity of a vehicle system fault in response to the lateral control degradation;
    determine a bounded error in response to the severity of the vehicle system fault;
    determine a safe disable location in response to the severity of the vehicle system fault;
    determine a current location and state of the host vehicle, and generate vehicle control data in response to the safe disable location wherein the vehicle control data includes a motion path between the current location and the safe disable location;
    generate a disable delay request indicative of the safe disable location and the severity of the vehicle system fault; and
    generate a driver alert indicative of a disable delay and a time remaining in the disable delay; and
    a vehicle controller for controlling the host vehicle to the safe disable location along the motion path in response to the disable delay request such that the host vehicle remains within the bounded error in response to the current location detected by a global positioning system sensor, a camera image and map data.

2. The vehicle disablement system for the host vehicle of claim 1, wherein the processor is further operative to determine a duration of a navigational time between the current location and the safe disable location, and a maximum disable delay in response to the severity of the lateral control degradation, and wherein the vehicle control data is generated in response to the maximum disable delay being greater than the navigational time.

3. The vehicle disablement system of claim 1, further including a user interface for generating a warning to a driver to control the vehicle to the safe disable location and wherein the vehicle controller is operative to control the vehicle in response to a driver input and to restrict a vehicle motion to within the bounded error.

4. The vehicle disablement system of claim 1, wherein the sensor is further operative to detect a longitudinal control degradation, and wherein the processor is further operative to estimate a vehicle speed in response to the longitudinal control degradation.

5. The vehicle disablement system of claim 1, wherein the motion path is between the current location and the safe disable location.

6. The vehicle disablement system of claim 1, wherein the processor is further operative to generate a user alert indicative of the safe disable location for presentation at a user interface.

7. The vehicle disablement system of claim 1, wherein the processor is configured to disable a vehicle system in response to the severity of the lateral control degradation exceeding a threshold severity.

8. The vehicle disablement system of claim 1, wherein the processor is configured to disable a vehicle system in response to a determination of the host vehicle arriving at the safe disable location.

9. The vehicle disablement system of claim 1, wherein the processor is configured to delay a disabling of a vehicle system in response to the severity of the lateral control degradation and the current location not being the safe disable location.

10. A method of disabling a vehicle system for a host vehicle comprising:
    detecting, by a sensor, a lateral control degradation;
    determining a severity of a vehicle system fault in response to the lateral control degradation;
    determining a bounded error in response to the severity of the vehicle system fault;
    determining a safe disable location in response to the severity of the vehicle system fault and a current location of the host vehicle;
    generating vehicle control data in response to the safe disable location wherein the vehicle control data includes a motion path between the current location and the safe disable location;
    generating a disable delay request indicative of the safe disable location and the severity of the vehicle system fault;
    generating a driver alert indicative of a disable delay and a time remaining in the disable delay; and
    controlling, by a vehicle controller, the host vehicle in response to the vehicle control data to the safe disable location along the motion path in response to the disable delay request wherein the vehicle controller is operative to control the host vehicle in response to a driver input and to restrict the host vehicle motion to within the bounded error such that the host vehicle remains within the bounded error in response to the current location detected by a global positioning system sensor, a camera image and map data.

11. The method of claim 10, further including generating a warning to a driver to control the vehicle to the safe disable location.

12. The method of claim 10, wherein the safe disable location is further determined in response to a situational data and map data received from an ADAS algorithm.

13. The method of claim 10, comprising determining a disable delay duration in response to the safe disable location, wherein the vehicle control data is generated in response to the disable delay duration.

14. The method of claim 10, comprising determining a disable delay duration in response to the severity of the vehicle system fault and the safe disable location.

15. The method of claim 10, comprising generating a user alert in response to the severity of the vehicle system fault exceeding a threshold severity.

16. The method of claim 10, comprising requesting a delay of a disablement event in response to the characteristic and the severity of the vehicle system fault.

17. The method of claim 10, comprising: determining a disable delay duration in response to the severity of the vehicle system fault and the safe disable location; and displaying the disable delay duration to a vehicle operator.

18. The method of claim 10, comprising disabling a vehicle system in response to the severity of the vehicle system fault exceeding a threshold severity.

19. A vehicle control system for a host vehicle comprising:
- a sensor for detecting a lateral control degradation;
- a processor configured to:
- determine a severity of a vehicle system fault in response to the lateral control degradation,
- determine a bounded error in response to the severity of the vehicle system fault;
- determine a safe disable location in response to the vehicle system fault;
- generate a motion path between a current location and the safe disable location;
- generate a disable delay request indicative of the safe disable location and the severity of the vehicle system fault;
- generate a driver alert indicative of a disable delay and a time remaining in the disable delay; and
- a vehicle controller for controlling the host vehicle to the safe disable location along the motion path in response to the disable delay request such that the host vehicle remains within the bounded error in response to a location detected by a global positioning system sensor, a camera image and map data.

20. The vehicle control system of claim 19, wherein the vehicle controller is further operative to: determine a disable delay duration in response to a current location and the safe disable location; and control the vehicle to the safe disable location in response to the disable delay duration being less than a threshold duration corresponding to the severity of the vehicle system fault and generating a driver warning to control the host vehicle to the safe disable location and wherein the vehicle controller is operative to control the host vehicle in response to a driver input and to restrict a host vehicle motion to within the bounded error.

* * * * *